G. P. CUTLER.
MUSTACHE SHIELD FOR CUPS.
No. 104,711. Fig. 1. Patented June 28, 1870.
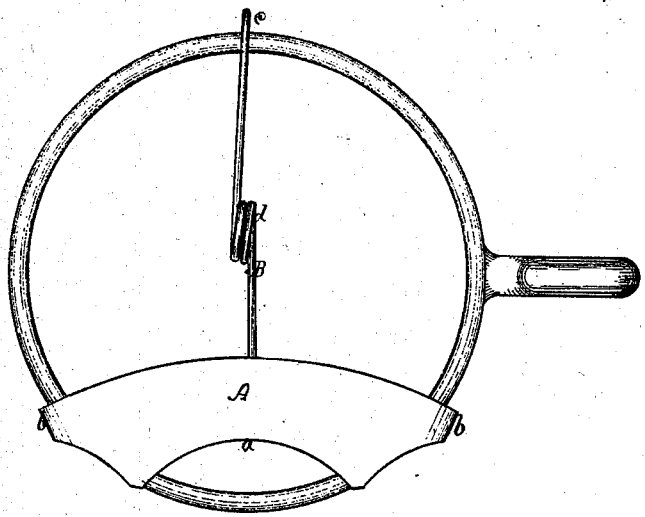
Fig. 2.
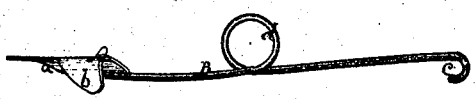
Fig. 3.
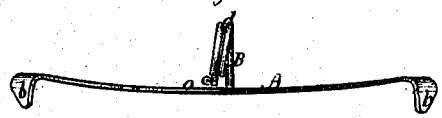
Witnesses:
D. J. Brown
R. D. O. Smith
George P. Cutler,
By his attorney,
J. S. Brown

United States Patent Office.

GEORGE P. CUTLER, OF LAWRENCE, MASSACHUSETTS.

Letters Patent No. 104,711, dated June 28, 1870.

IMPROVED MUSTACHE-SHIELD FOR CUPS.

The Schedule referred to in these Letters Patent and making part of the same.

*To all whom it may concern:*

Be it known that I, GEORGE P. CUTLER, of Lawrence, in the county of Essex and State of Massachusetts, have invented an Improved Mustache-Shield for Cups, and other drinking-vessels; and I do hereby declare that the following is a full and exact description thereof, reference being had to the accompanying drawing making part of this specification—

Figure 1 being a top view of the shield.
Figure 2, a side view of the same.
Figure 3, a front view thereof.

Like letters designate corresponding parts in all of the figures.

The shield is formed of a plate, A, of silver, or other suitable metal or material, of the form shown, or an equivalent form suitable for the purpose, and of proper length to reach across the edge of the cup, and leave room between its concave edge $a$ and the edge of the cup, to give passage to the coffee, or other beverage, in drinking.

The ends $b\ b$ of the shield turn downward and slightly inward, as shown most clearly in fig. 3, and at such an angle, transversely, as to fix and hold over the edges of the cup.

To the back edge of the shield is secured a wire, or equivalent form of holder or clasp, B, which extends backward far enough to reach to the back edge of the cup, where it terminates in a hook or catch, $c$, to hold over the said edge.

This holder or clasp has a bend or coil, $d$, somewhere in its length, to give it longitudinal elasticity and capability of some extension lengthwise, so as to spring and hold over the cup edge.

The form and length of the concave edge $a$ correspond nearly with the opposite edge of the cup, as seen in fig. 1, and are such as to make an aperture of the proper form to suit the lips, and furnish a passage for the liquid.

What I claim as my invention, and desire to secure by Letters Patent, is—

A mustache-shield, A, provided with a spring-holder or clasp, B, substantially as and for the purpose herein specified.

GEO. P. CUTLER.

Witnesses:
N. G. WHITE,
J. N. WILLIS.